(12) United States Patent
Toshima et al.

(10) Patent No.: US 7,156,547 B2
(45) Date of Patent: Jan. 2, 2007

(54) LIGHT DIFFUSIVE SHEET AND AREA LIGHT SOURCE ELEMENT USING THE SAME

(75) Inventors: Yasumaro Toshima, Saitama (JP); Masashi Takai, Saitama (JP); Hideharu Nagami, Mie-ken (JP)

(73) Assignee: Kimoto Co., Ltd., Tokyo (JP)

( * ) Notice: Subject to any disclaimer, the term of this patent is extended or adjusted under 35 U.S.C. 154(b) by 523 days.

(21) Appl. No.: 10/376,293

(22) Filed: Mar. 3, 2003

(65) Prior Publication Data
US 2003/0174518 A1 Sep. 18, 2003

(30) Foreign Application Priority Data
Mar. 6, 2002 (JP) ............... 2002-059694
Mar. 6, 2002 (JP) ............... 2002-059695

(51) Int. Cl.
*F21V 8/00* (2006.01)

(52) U.S. Cl. .................. 362/618; 362/622; 362/331; 359/599

(58) Field of Classification Search ................ 362/26, 362/558, 561, 330, 331, 339, 615, 617, 618, 362/620, 621, 622; 359/599
See application file for complete search history.

(56) References Cited

U.S. PATENT DOCUMENTS

| | | | |
|---|---|---|---|
| 6,327,088 B1 * | 12/2001 | Iwata et al. ............... 359/599 |
| 6,505,959 B1 * | 1/2003 | Masaki et al. ............. 362/339 |
| 6,570,710 B1 * | 5/2003 | Nilsen et al. .............. 359/625 |
| 6,602,596 B1 * | 8/2003 | Kimura et al. ............. 428/327 |
| 6,709,143 B1 * | 3/2004 | Harada et al. ............. 362/558 |
| 6,861,121 B1 * | 3/2005 | Matsunaga et al. ........ 428/141 |
| 2002/0057564 A1 * | 5/2002 | Campbell et al. ........... 362/31 |
| 2002/0181223 A1 * | 12/2002 | Ryu et al. ................ 362/31 |

FOREIGN PATENT DOCUMENTS

| | | |
|---|---|---|
| JP | 6-258504 | 9/1994 |
| JP | 8-227005 | 9/1996 |

* cited by examiner

*Primary Examiner*—Stephen Husar
*Assistant Examiner*—Peggy A. Neils
(74) *Attorney, Agent, or Firm*—Bacon & Thomas, PLLC

(57) ABSTRACT

A light diffusive sheet of the present invention comprises a transparent polymer sheet provided with a light diffusion layer 3 on one side and an uneven surface 4a having arithmetical mean deviation of 0.5 μm or less and mean spacing of 80 μm or narrower on the opposite side. Such an uneven surface can be made by forming a backcoat layer 4 including a mixture of particles having particular mean diameters in a particular proportion to a binder resin on the transparent polymer sheet. An area light source element 7 of the present invention is produced by laminating a prism sheet 6 on a light guide plate 5 so that the prism surface 61 of the prism sheet 6 is opposed to the light-emitting surface 51 of the light guide plate 5 and laminating the light diffusive sheet on the prism sheet 6 so that the uneven surface (backcoat layer) of the light diffusive sheet is opposed to the surface opposite of the prism surface. The light diffusive sheet of the present invention can prevent occurrence of a rainbow-like annular pattern without deteriorating the front luminance and view angle of the area light source even when combined with a downward-facing prism sheet.

9 Claims, 4 Drawing Sheets

LIGHT DIFFUSIVE SHEET AND AREA LIGHT SOURCE ELEMENT USING THE SAME

BACKGROUND OF THE INVENTION

The present invention relates to an area light source element constituting an area light source suitably used for a liquid crystal display etc. and a light diffusive sheet suitably used as a member constituting the area light source element.

RELATED ART

Conventionally, an area light source called an edge-light type backlight has been used for a liquid crystal display etc.

In general, in such an area light source, as shown in FIG. 6, a light-reflecting member 9 is laminated on a surface opposite of a light-emitting surface 51 of a light guide plate 5 equipped with a lamp such as a cold-cathode tube at least on one side surface 52, and a plurality of light-transmitting members such as light diffusive sheets 1 and prism sheets 6 are laminated on the light-emitting surface 51.

In recent years, development of an area light source superior in so-called cost-performance is under study. Specifically, the number of these laminated light-transmitting members is reduced to realize reduced costs as well as increased front luminance (luminance in the direction normal to the light-emitting surface of a light guide plate).

One of examples of an area light source element constituting such an area light source typically adopts a so-called "downward-facing prism sheet" (an antonym of conventional "upward-facing prism sheet" in which a prism surface faces in the light-emitting surface direction), as shown in FIG. 7, in which a prism sheet 6 is laminated on the light-emitting surface 51 of a light guide plate 5 so that the prism surface 61 should be opposed thereto.

However, although front luminance is increased in an area light source using an area light source element adopting such a downward-facing prism sheet, luminance in a direction slightly off the front direction (direction normal to the light-emitting surface of the light guide plate) is extremely decreased, resulting in a narrow view angle. That is, a problem arises that directionality of outgoing light from the area light source element becomes too high.

Accordingly, an area light source element in which a light diffusive sheet is laminated on the surface of the downward-facing prism sheet opposite of the prism surface has been examined. However, when a light diffusive sheet used as a conventional light-transmitting member is used, a view angle widens and too high directionality is improved, but instead the front luminance is decreased.

In order to solve these problems, a light diffusive sheet that does not deteriorate the front luminance or view angle of an area light source when laminated on such a downward-facing prism sheet has been examined. In the examination, it has been found that, even when a light diffusive sheet in which optical characteristics such as haze are simply adjusted is laminated on such a downward-facing prism sheet to form an area light source element, and an area light source is constituted by using this area light source element, many rainbow-like annular patterns occur in the area light source probably because outgoing light from the downward-facing prism sheet has directionality.

Accordingly, an object of the present invention is to provide a light diffusive sheet that can prevent occurrence of a rainbow-like annular pattern without deteriorating front luminance or a view angle of an area light source when laminated on a so-called downward-facing prism sheet of an area light source element using the downward-facing prism sheet.

Another object of the present invention is to provide an area light source element in which occurrence of a rainbow-like annular pattern is prevented without deteriorating front luminance or a view angle as an area light source.

DISCLOSURE OF THE INVENTION

In order to achieve the foregoing objects, the inventors of the present invention conducted various studies about configurations of a surface of light diffusive sheet opposed to a prism sheet. As a result, they found that when the surface is made into a particular configuration, a rainbow-like annular pattern that otherwise occurs when laminated on a prism sheet could be prevented.

With regard to the surface configuration of a conventional light diffusive sheet laminated on a light guide plate of a liquid crystal display device etc., there are known light diffusive sheets having unevenness on the surface opposite of the light diffusion layer. One of such light diffusive sheets is provided with a sticking preventing layer containing beads in a binder on a surface brought into contact with a light guide plate, i.e., a surface opposite of the light diffusion surface, to prevent adhesion to the light guide plate. Another has a transparent substrate whose surfaces, on which a light diffusion layer is formed, are subjected to embossing to improve light diffusion (Japanese Patent Application Publication Nos. H8-227005, H6-258504, etc.).

While these light diffusive sheets unevenness on the surface opposite of the light diffusion layer, they cannot sufficiently prevent an occurrence of annular patterns when used with a prism sheet in combination.

According to the close study by the inventors of the present invention, only when the surface of the light diffusive sheet opposed to the prism sheet was made uneven, and both mean roughness and spacing distance were regulated, occurrence of an annular pattern could be effectively prevented, excessive concentration of light in the front direction by the prism sheet could be prevented, and high luminance and a wide view angle could be achieved.

Accordingly, the light diffusive sheet of the present invention is characterized in that a transparent polymer film has a light diffusion layer on one side and an uneven surface having arithmetical mean deviation of 0.5 μm or less and mean spacing of 80 μm or narrower on the other side.

An uneven surface having such a shape may be directly formed on the transparent polymer film. Alternatively, a backcoat layer may be formed on the surface of the transparent polymer film opposite of a light diffusion layer, and the uneven surface may be formed on this backcoat layer.

Further, the light diffusive sheet of the present invention is a light diffusive sheet having a light diffusion layer on one side of a transparent polymer film and a light diffusive sheet having a backcoat layer on the other side, wherein the backcoat layer is made of at least a binder resin and particles, and the particles are a mixture of two kinds of particles having different mean particle diameters and are contained in a proportion of 1 part by weight or more and 10 parts by weight or less based on 100 parts by weight of the binder resin.

As the two kinds of particles having different mean particle diameters, particles having a mean particle diameter of 5 μm or more and particles having a mean particle diameter of less than 5 μm are typically used.

Further, in the light diffusive sheet of the present invention, each of the particles having different mean particle diameters, e.g., particles having an mean particle diameter of 5 μm or more and particles having a mean particle diameter of less than 5 μm, are mixed in a proportion of 0.5 parts by weight or more and 9.5 parts by weight or less based on 100 parts by weight of the binder resin.

The arithmetical mean deviation (Ra) and the mean spacing (RSm) in the present invention are the arithmetical mean deviation and mean spacing of JIS-B0601:1994, which are measured using a surface roughness measuring device. Further, the mean particle diameter in the present invention is measured by the coulter counter method.

An area light source element of the present invention is characterized in that a prism sheet is laminated on the light-emitting surface of a light guide plate so that its prism surface should be opposed thereto, and the light diffusive sheet of the present invention is laminated on the surface of the prism sheet opposite of the prism surface so that its uneven surface (including an uneven surface formed on the backcoat layer) should be opposed thereto.

PREFERRED EMBODIMENT OF THE INVENTION

The light diffusive sheet of the present invention and the area light source element using the same will be explained in detail hereinafter.

Figure 1:
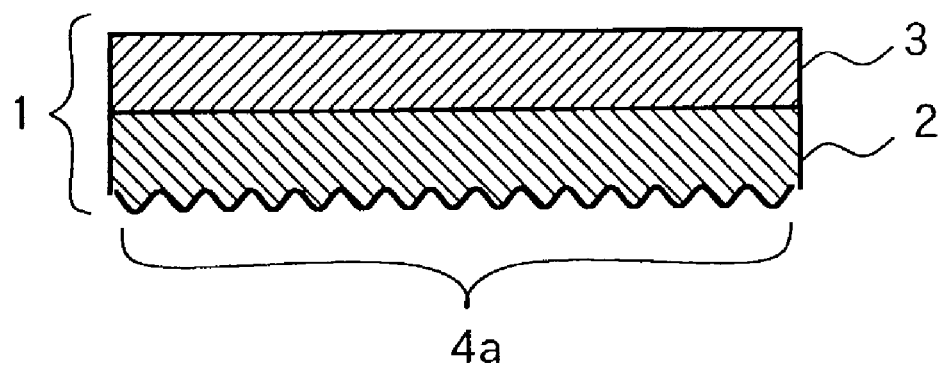
FIG. 1 is a cross sectional view showing one embodiment of the light diffusive sheet of the present invention.
Figure 2:
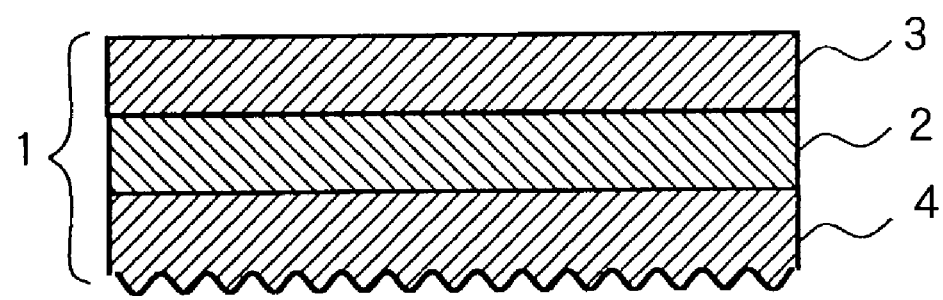
FIG. 2 is a cross sectional view showing another embodiment of the light diffusive sheet of the present invention.

First, embodiments of the light diffusive sheet of the present invention will be explained. FIGS. 1 and 2 show embodiments of the light diffusive sheet of the present invention. The light diffusive sheet 1 shown in FIG. 1 has a light diffusion layer 3 on one side of a transparent polymer film 2 and an uneven surface 4a of a particular configuration on the other side. The light diffusive sheet 1 shown in FIG. 2 has a light diffusion layer 3 on one side of a transparent polymer film 2 and a backcoat layer 4 on the other side, and has an uneven surface of a particular shape on the surface of this backcoat layer 4.

The light diffusive sheets of the present invention having such structures are imparted with optical characteristics generally required as a light diffusive sheet, and have a particular uneven surface that does not deteriorate front luminance or a view angle when incorporated into an area light source. As the optical characteristics of the light diffusive sheet, total light transmittance and haze are important, and it is preferred in the present invention that the total light transmittance is 90% or higher and that the haze is 70% or lower. With such optical characteristics, superior front luminance and view angle can be easily obtained even when the light diffusive sheet is laminated on a downward-facing prism sheet to be used for an area light source.

The terms "total light transmittance" and "haze" used herein mean values of total light transmittance and haze of JIS-K7105:1981, and have a relationship of Td (%)/Tt (%)×100=H (%) [Td: diffused light transmittance; Tt: total light transmittance; H: haze]. These are values measured by using an optical measuring unit called a haze meter while making incident light beams enter at the uneven surface side.

Components of the light diffusive sheet of the present invention will be explained below.

First, as the transparent polymer film, known materials can be used so long as transparency is not impaired. Particular examples thereof include polyethylene terephthalate, polybutylene terephthalate, polyethylene naphthalate, polycarbonate, polyethylene, polypropylene, polystyrene, triacetyl cellulose, acrylic, polyvinyl chloride, and so forth. Among these, a polyethylene terephthalate film subjected to orienting, in particular, biaxial orienting is preferred from the viewpoint of superiority in mechanical strength and dimensional stability. Further, to improve adhesion to a light diffusion layer etc., those of which surface is subjected to corona discharge treatment or provided with an easy adhesion layer are preferably used.

The thickness of such a transparent polymer film is suitably selected depending on the material used, but is generally 25–500 μm, preferably 50–200 μm.

The light diffusion layer is not particularly limited so long as optical characteristics as a light diffusive sheet are not deteriorated. From the viewpoint of easy regulation of optical characteristics as a light diffusive sheet, those made of a light diffusion agent and a binder resin are preferred.

Here, examples of the light diffusion agent for forming a light diffusion layer include extender pigments such as calcium carbonate, magnesium carbonate, barium sulfate, silica, aluminium hydroxide, kaolin, clay, and talc, synthetic resin particles such as acrylic resin particles, polystyrene resin particles, polyurethane resin particles, polyethylene resin particles, benzoguanamine resin particles, and epoxy resin particles, and particle-type wax such as hydrocarbon wax, fatty acid wax, and fatty acid amide wax. The mean particle diameter of such light diffusion agents is 1.0 μm or more, preferably 5.0 μm or more, and 50.0 μm or less, preferably 40.0 μm or less.

As the binder resin for forming a light diffusion layer, resins having optical transparency such as thermoplastic resins, thermosetting resin, and ionizing radiation curing resin can be used. Such resins includes polyester resins, acrylic resins, polyester acrylate resins, polyurethane acrylate resins, epoxy acrylate resins, cellulose resins, acetal resins, vinyl resins, polyethylene resins, polystyrene resins, polypropylene resins, polyamide resins, polyimide resins, melamine resins, phenol resins, silicone resins, and fluorine resins. Among these resins, acrylic resins having weather resistance as well as high transparency, particularly acrylic polyurethane of a 2-component curing type are preferred. In particular, when those having high OH value are used so that the crosslinking density should become high, a tough coated film can be obtained even when a large amount of resin particles are contained.

It is desirable that the light diffusion agent is mixed in a proportion of 40 parts by weight or more, preferably 45 parts by weight or more, and 80 parts by weight or less, preferably 75 parts by weight or less based on 100 parts by weight of the binder resin. By making the proportion 40 parts by weight or more, a favorable view angle as a light diffusive sheet is easily obtained. By making the proportion 80 parts by weight or less, favorable front luminance is easily obtained.

The thickness of the light diffusion layer is 1 μm or more, preferably 5 μm or more, and 30 μm or less, preferably 20 μm or less.

The uneven surface, which is formed on the side opposite of the aforementioned light diffusion layer, may be directly formed on the transparent polymer film 2 as shown in FIG. 1, or a backcoat layer 4 may be formed on the surface of the transparent polymer film 2 opposite of the surface on which the light diffusion layer 3 is formed and an uneven surface is formed on the backcoat layer as shown in FIG. 2. In either case, the uneven surface has a configuration of the arithmetical mean deviation of 0.5 μm or less and the mean spacing of 80 μm or less.

By making the arithmetical mean deviation of the uneven surface 0.5 μm or less, sufficient front luminance and a view angle of an area light source can be realized when the area light source element of the present invention formed by using the light diffusive sheet of the present invention is used for an area light source. However, even when the arithmetical mean deviation of the uneven surface is 0.5 μm or less, a rainbow-like annular pattern is prone to occur if the mean spacing is wide. In order to prevent such occurrence of an annular pattern, the mean spacing of the uneven surface is made 80 μm or narrower. Further, to easily make the mean spacing 80 μm or narrower, the arithmetical mean deviation is preferably made 0.15 μm or more. Further, to easily make the arithmetical mean deviation 0.5 μm or less, the mean spacing is preferably made 60 μm or wider.

A manner of making the uneven surface is not particularly limited so long as the aforementioned particular surface configuration is formed on the surface of the light diffusive sheet of the present invention opposite of the light diffusion layer. For example, the particular configuration can be transferred to the surface by bringing the surface into contact with a molding film etc. having a particular surface shape (inverted shape of the aforementioned particular surface shape) during a process of producing a transparent polymer film or in a state that a resin layer applied onto one surface of the transparent polymer film is uncured or semi-cured. From the viewpoint of easy surface shape regulation and production, the uneven surface is preferably formed by providing a backcoat layer containing particles and a binder resin on one surface of the transparent polymer film.

The surface configuration of the backcoat layer containing particles and a binder resin can be regulated by regulating factors such as the film thickness of the layer, content ratio of the particles and the resin, particle diameters, and the number of particles per unit area. At this time, these should be regulated in consideration of optical characteristics as a light diffusive sheet (light diffusion, light transmission etc.).

A preferable constitution of a backcoat layer for realizing the aforementioned particular surface configuration will now be explained.

As the particles used for a backcoat layer, a mixture of two types of particles having different mean particle diameters is used. According to the studies by the inventors of the present invention, it is difficult to suitably regulate a surface configuration with only one type of particles irrespective of the width of the particle diameter distribution, but the surface configuration can be easily regulated by using such a mixture. In particular, to realize a surface configuration that satisfies optical characteristics as a light diffusive sheet and has the aforementioned arithmetical mean deviation of 0.5 μm or less and the mean spacing of 80 μm or narrower, a mixture composed of particles having a mean particle diameter of 5 μm or more, preferably 6 μm or more, and particles having an mean particle diameter of less than 5 82 m, preferably less than 4 μm, is contained in a proportion of 1 part by weight or more, preferable 2 parts by weight or more, and 10 parts by weight or less, preferably 8 parts by weight or less based on 100 parts by weight of a binder resin.

The aforementioned range of the content of particles (ratio to the binder) is preferred in order to obtain front luminance and a view angle sufficient for an area light source when the area light source element of the present invention constructed by using the light diffusive sheet of the present invention is incorporated in an area light source. Further, to realize the aforementioned particular surface configuration with such a content of particles, a mixture of two types of particles having a particle diameter in the aforementioned range is preferably used.

Further, each of these two types of particles are preferably mixed in a proportion of 0.5 parts by weight or more, preferably 1 part by weight or more, and 9.5 parts by weight or less, preferably 7 parts by weight or less based on 100 parts by weight of the binder resin. The mixing ratio of the two types of particle is not particularly limited and depends on the relationship with the film thickness described later. However, the arithmetical mean deviation and mean spacing become larger when the proportion of the particles having a larger diameter is greater, and surface configuration can be easily regulated when the proportion of the particles having a smaller diameter is greater. Accordingly, the proportion of particles having a diameter of 5 μm or more and particles having a diameter of less than 5 μm is, not limited thereto, preferably 1:2–1:10, more preferably 1:3–1:7 by weight ratio.

As the material of the particles, extender pigments, synthetic resin particles, particle-type wax and so forth exemplified as the light diffusion agent for forming a light diffusion layer can be used. The material of the two types of particles having different mean particle diameters may be the same or different.

As the binder resin for forming a backcoat layer, those exemplified as the binder resins for forming a light diffusion layer can be used. The resin may be the same as or different from the one used for the light diffusion layer.

The thickness of the backcoat layer is 0.5 μm or more, preferably 1 μm or more, and 20 μm or less, preferably 15 μm or less.

Additives such as dispersing agents, antistatic agents, and leveling agents can be suitably contained in the light diffusion layer and the backcoat layer as required so long as the function of the light diffusive sheet of the present invention is not deteriorated.

The light diffusion layer and the backcoat layer as described above can be formed by suitably mixing a light diffusion agent or particles and a binder resin with an additive or a diluting solvent as required to prepare a coating solution and coating a transparent polymer film surface with the coating solution by a known coating method.

The light diffusive sheet of the present invention composed as above has optical characteristics required for a light diffusive sheet and can be used for a general purpose of a light diffusive sheet. In particular, since a particular surface shape that does not deteriorate front luminance and a view angle as an area light source is formed on the surface opposite of a light diffusion layer, or a particular backcoat layer is formed, it is suitable to use the light diffusive sheet for laminating on a downward-facing prism sheet, and occurrence of an annular pattern, which is a problem in such use, can be prevented.

The area light source element using the light diffusive sheet of the present invention will be explained next.

Figure 3:
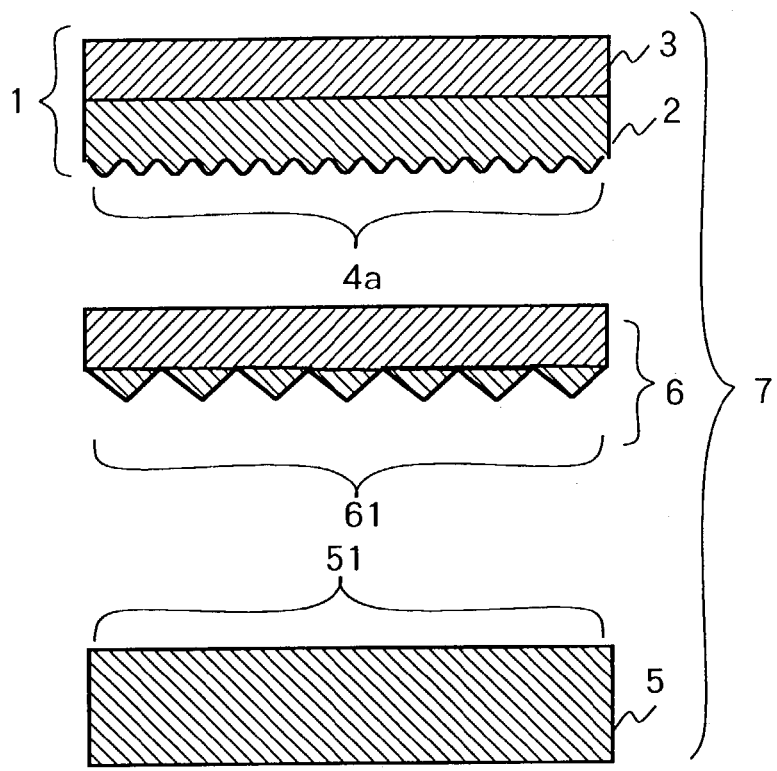
FIG. 3 is a cross sectional view showing one embodiment of the area light source element of the present invention.
Figure 4:
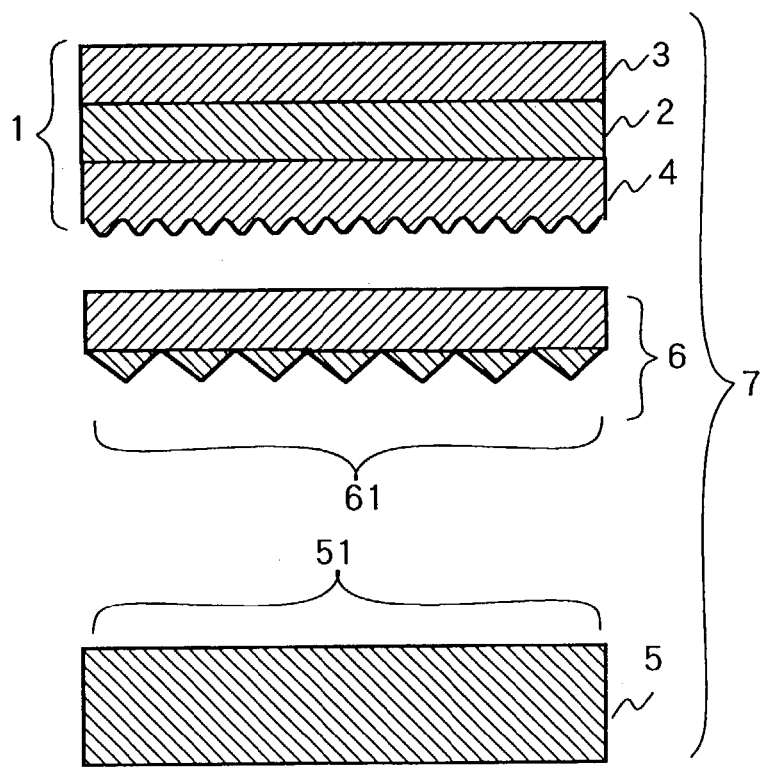
FIG. 4 is a cross sectional view showing another embodiment of the area light source element of the present invention.

FIGS. 3 and 4 show structures of area light source elements incorporating the light diffusive sheets in FIGS. 1 and 2, respectively.

The area light source element 7 of the present invention comprises a light guide plate 5, a prism sheet 6, and a light diffusive sheet as fundamental components. The prism sheet 6 is laminated (stacked) on the light-emitting surface 51 of the light guide plate 5 so that the prism surface 61 should be opposed thereto as shown in the figures, and the light diffusive sheet 1 of the present invention is laminated on the surface of the prism sheet 6 opposite of the prism surface 61 so that the uneven surface 4a (backcoat layer 4) should be opposed thereto. So long as effect of the present invention is not deteriorated, other light-transmitting members may be laminated between the light guide plate and the prism sheet, or between the prism sheet and the light diffusive sheet.

Here, the light guide plate is a substantially planar member with high transparency that is formed so that at least one side thereof should serve as a light-incidence surface and that a surface perpendicular thereto should serve as a light-emitting surface. While such a light guide plate may have uniformly planar surfaces, it may have various complicated surface configurations or have diffusion printings in a dot pattern etc. so that incident light that enters at the light-incidence surface should be efficiently emitted from the light-emitting surface. In particular, the light guide plate is preferably designed such that light emitted from the light-emitting surface refracts and enters at the prism surface of the prism sheet and is emitted from the prism sheet in a direction as perpendicular as possible to the surface of an area light source element.

The prism sheet is, for example, a sheet-like material having a multiplicity of prism lenses that are continuously formed on one surface thereof. Here, it is preferred to use a prism sheet having prism lenses of which shape is suitably adjusted in accordance with the light-emitting angle from the light-emitting surface of the light guide plate.

The light diffusive sheet, as aforementioned, has a light diffusion layer on one surface of the transparent polymer film and an uneven surface (including an uneven surface formed as a backcoat layer) on the other surface. It is necessary that this uneven surface (backcoat layer) should be laminated so as to face the surface of the prism sheet opposite of the prism surface opposed to the light guide plate.

Figure 5:
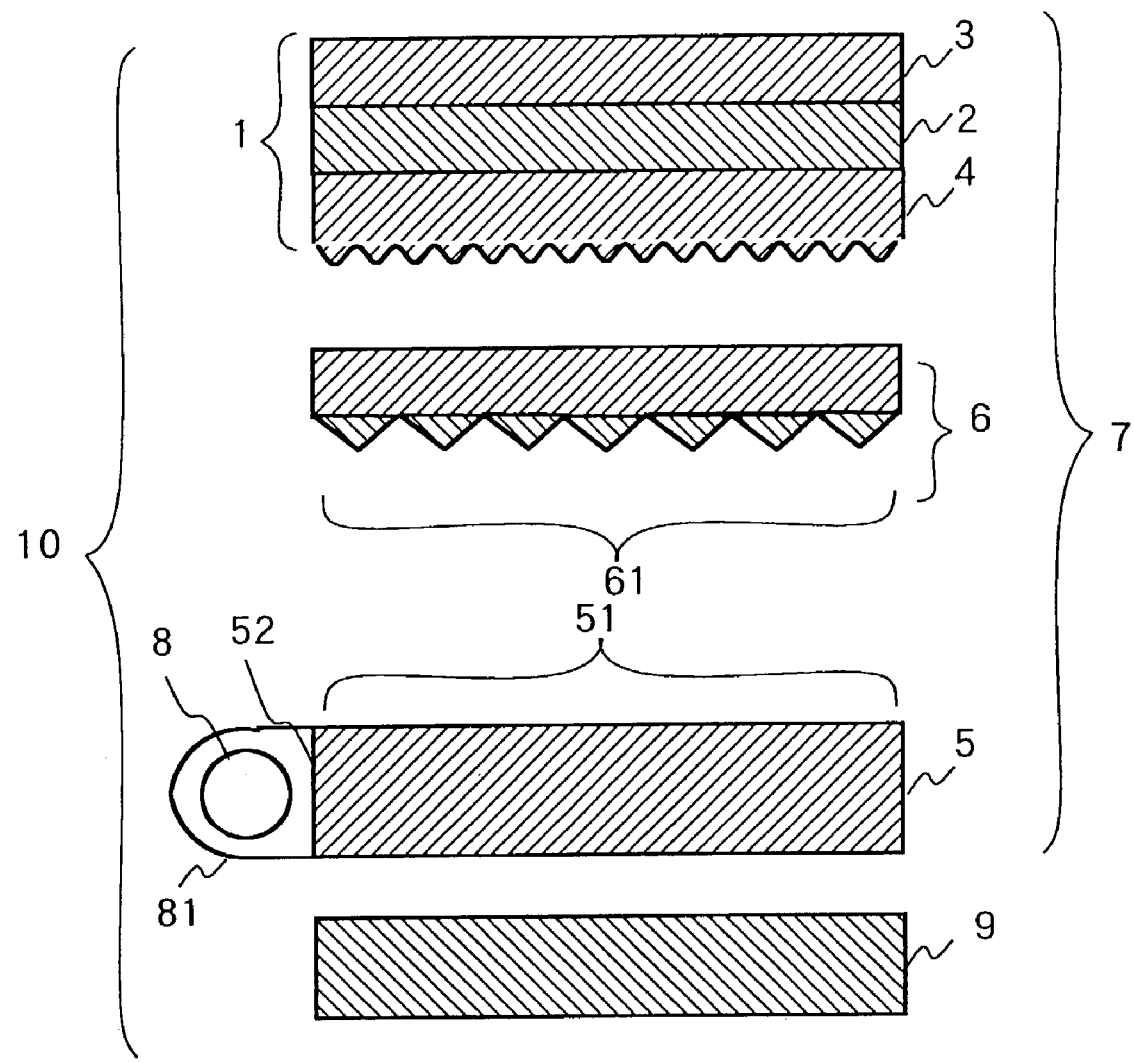
FIG. 5 is a cross sectional view showing one embodiment of an area light source using the area light source element of the present invention.
Figure 6:
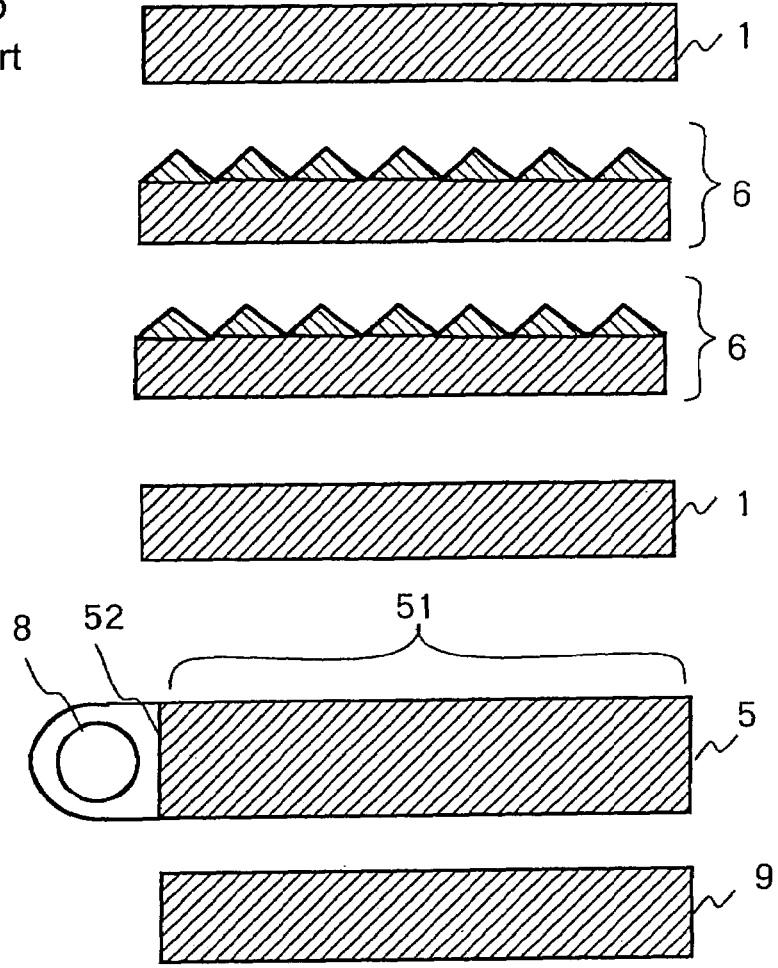
FIG. 6 is a cross sectional view showing a conventional area light source.
Figure 7:
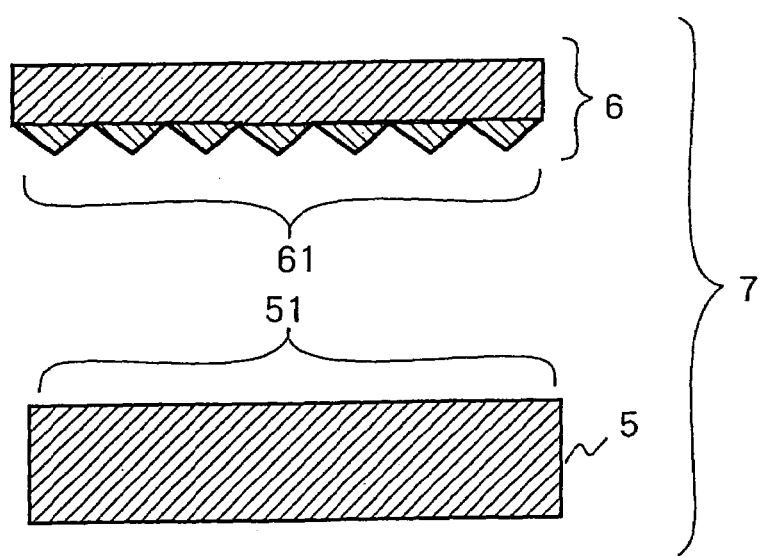
FIG. 7 is a cross sectional view showing a conventional area light source element.

The thus composed area light source element 7 constitutes an area light source 10 as shown in FIG. 5, in which a lamp 8 such as a cold-cathode tube covered with a lamp reflector 81 is disposed on the light-incidence surface 52 of the light guide plate 5, and a light-reflecting member 9 is disposed on the surface opposite of the light-emitting surface 51 to. A liquid crystal display device etc. is constructed by laminating this area light source 10 on a liquid crystal display panel etc.

Since the area light source element 7 of the present invention is constructed by incorporating a light diffusive sheet having a particular surface configuration outside the prism sheet (light-emitting side), occurrence of a annular pattern in an area light source is prevented without deteriorating front luminance and a view angle.

EXAMPLES

Examples of the present invention will be explained hereinafter. In the following examples, "part" and "%" are used on a weight basis unless otherwise indicated.

Example 1

Coating solution (a) for backcoat layer having the following composition was applied to one surface of a transparent polyethylene terephthalate film (Lumirror T-60: Toray Industries Inc.) having a thickness of 100 μm, and dried and cured with heat to form a backcoat layer having a thickness of about 4 μm. Then, Coating solution (b) for light diffusion layer having the following composition was applied to the surface opposite of the backcoat layer, and dried and cured with heating to form a light diffusion layer having a thickness of about 12 μm. Thus, a light diffusive sheet was produced.

| <Coating solution (a) for backcoat layer> | |
|---|---|
| Acrylic polyol (Acrydic A-807, solid content: 50%, Dainippon Ink and Chemicals, Inc.) | 162 Parts |
| Isocyanate (Takenate D110N, solid content: 60%, Mitsui Takeda Chemicals, Inc.) | 32 Parts |
| Polyethylene wax dispersion (solid content: 10%, mean particle diameter: μm) | 30 Parts |
| Acrylic resin particles (Techpolymer MB30X-10SS, mean particle diameter: 10 μm, Sekisui Plastics Co., Ltd.) | 0.5 Parts |
| Butyl acetate | 200 Parts |
| Methyl ethyl ketone | 200 Parts |

| <Coating solution (b) for light diffusion layer> | |
|---|---|
| Acrylic polyol (Acrydic A-807, solid content: 50%, Dainippon Ink and Chemicals, Inc.) | 162 Parts |
| Isocyanate (Takenate D110N, solid content: 60%, Mitsui Takeda Chemicals, Inc.) | 32 Parts |
| Acrylic resin particles (Ganzpearl GM-0605, mean particle diameter: 6 μm, Ganz Chemical Co., Ltd.) | 60 Parts |
| Butyl acetate | 200 Parts |
| Methyl ethyl ketone | 200 Parts |

Example 2

A light diffusive sheet was produced in the same manner as in Example 1 except that Coating solution (c) for backcoat layer having the following composition was used instead of Coating solution (a) for backcoat layer of Example 1 to form a backcoat layer having a thickness of about 4 μm.

| <Coating solution (c) for backcoat layer> | |
|---|---|
| Acrylic polyol (Acrydic A-807, solid content: 50%, Dainippon Ink and Chemicals, Inc.) | 162 Parts |

-continued

<Coating solution (c) for backcoat layer>

| | |
|---|---|
| Isocyanate | 32 Parts |
| (Takenate D110N, solid content: 60%, | |
| Mitsui Takeda Chemicals, Inc.) | |
| Polyethylene wax dispersion | 30 Parts |
| (solid content: 10%, | |
| mean particle diameter: 3 μm) | |
| Acrylic resin particles | 1 Part |
| (Techpolymer MBX-8, mean particle diameter: 8 μm, | |
| Sekisui Plastics Co., Ltd.) | |
| Butyl acetate | 200 Parts |
| Methyl ethyl ketone | 200 Parts |

Comparative Example 1

A light diffusive sheet was produced in the same manner as in Example 1 except that Coating solution (d) for backcoat layer having the following composition was used instead of Coating solution (a) for backcoat layer of Example 1 to form a backcoat layer having a thickness of about 3 μm.

<Coating solution (d) for backcoat layer>

| | |
|---|---|
| Acrylic polyol | 162 Parts |
| (Acrydic A-807, solid content: 50%, | |
| Dainippon Ink and Chemicals, Inc.) | |
| Isocyanate | 32 Parts |
| (Takenate D110N, solid content: 60%, | |
| Mitsui Takeda Chemicals, Inc.) | |
| Polyethylene wax dispersion | 30 Parts |
| (solid content: 10%, | |
| mean particle diameter: 3 μm) | |
| Butyl acetate | 200 Parts |
| Methyl ethyl ketone | 200 Parts |

Comparative Example 2

A light diffusive sheet was produced in the same manner as in Example 1 except that Coating solution (e) for backcoat layer having the following composition was used instead of Coating solution (a) for backcoat layer of Example 1 to form a backcoat layer having a thickness of about 4 μm.

<Coating solution e for backcoat layer>

| | |
|---|---|
| Acrylic polyol | 162 Parts |
| (Acrydic A-807, solid content: 50%, | |
| Dainippon Ink and Chemicals, Inc.) | |
| Isocyanate | 32 Parts |
| (Takenate D110N, solid content: 60%, | |
| Mitsui Takeda Chemicals, Inc.) | |
| Acrylic resin particles | 3.5 Parts |
| (Techpolymer MB30X-10SS, mean particle diameter: | |
| 10 μm, Sekisui Plastics Co., Ltd.) | |
| Butyl acetate | 200 Parts |
| Methyl ethyl ketone | 200 Parts |

Comparative Example 3

A light diffusive sheet was produced in the same manner as in Comparative Example 2 except that the content of acrylic resin particles of Coating solution (e) for backcoat layer is changed to be 0.5 Parts.

Comparative Example 4

Coating solution (f) for backcoat layer having the following composition was applied to one surface of a transparent polyethylene terephthalate film (Lumirror T-60: Toray Industries Inc.) having a thickness of 100 μm, and dried and cured with heating to form a backcoat layer having a thickness of about 12 μm. Then, Coating solution (g) for light diffusion layer having the following composition was applied to the surface opposite of the backcoat layer, and dried and cured with heating to form a light diffusion layer having a thickness of about 12 μm. Thus, a light diffusive sheet was produced.

<Coating solution (f) for backcoat layer>

| | |
|---|---|
| Acrylic polyol | 162 Parts |
| (Acrydic A-807, solid content: 50%, | |
| Dainippon Ink and Chemicals, Inc.) | |
| Isocyanate | 32 Parts |
| (Takenate D110N, solid content: 60%, | |
| Mitsui Takeda Chemicals, Inc.) | |
| Polyethylene wax dispersion | 30 Parts |
| (solid content: 10%, | |
| mean particle diameter: 3 μm) | |
| Acrylic resin particles | 30 Parts |
| (Techpolymer MBX-8, mean particle diameter: 8 μm, | |
| Sekisui Plastics Co., Ltd.) | |
| Butyl acetate | 200 Parts |
| Methyl ethyl ketone | 200 Parts |

<Coating solution (g) for light diffusion layer>

| | |
|---|---|
| Acrylic polyol | 162 Parts |
| (Acrydic A-807, solid content: 50%, | |
| Dainippon Ink and Chemicals, Inc.) | |
| Isocyanate | 32 Parts |
| (Takenate D110N, solid content: 60%, | |
| Mitsui Takeda Chemicals, Inc.) | |
| Acrylic resin particles | 30 Parts |
| (Techpolymer MBX-8, mean particle diameter: 8 μm, | |
| Sekisui Plastics Co., Ltd.) | |
| Butyl acetate | 200 Parts |
| Methyl ethyl ketone | 200 Parts |

The results of measurement of haze and total light transmittance of the light diffusive sheets, and surface shapes of the backcoat layers thus obtained in the examples and the comparative examples are shown in Table 1. For reference, Table 1 shows the values of a light diffusive sheet having no backcoat layer that was produced otherwise in the same manner as in Example 1.

TABLE 1

| | Haze (%) | Total light transmittance (%) | Arithmetical mean deviation (μm) | Mean spacing (μm) |
|---|---|---|---|---|
| Example | | | | |
| 1 | 65.9 | 93.2 | 0.16 | 72.1 |
| 2 | 66.7 | 93.5 | 0.18 | 67.0 |
| Comparative Example | | | | |
| 1 | 65.4 | 93.6 | 0.11 | 99.7 |
| 2 | 65.3 | 93.4 | 0.53 | 196.9 |
| 3 | 65.1 | 93.9 | 0.09 | 206.6 |

TABLE 1-continued

| | Haze (%) | Total light transmittance (%) | Arithmetical mean deviation (μm) | Mean spacing (μm) |
|---|---|---|---|---|
| 4 | 65.4 | 91.3 | 0.87 | 58.2 |
| Reference | 65.2 | 93.7 | 0.04 | 124.0 |

Examples 3, 4

A prism sheet was laminated on the light-emitting surface of a light guide plate having a diagonal width of 13.3 inches (1 inch=25.4 mm) so that the prism surface should be opposed thereto, and the light diffusive sheet produced in Examples 1 or 2 was laminated on the surface of the prism sheet opposite of the prism surface so that the backcoat layer should be opposed thereto. Thus, area light source elements were produced.

Subsequently, a cold-cathode tube covered with a lamp reflector was disposed at one end surface of the light guide plate that was a light-incidence surface, and a light-reflecting member was disposed on the surface opposite of the light-emitting surface to obtain area light sources.

Comparative Examples 5–8

Area light source elements were produced in the same manner as in Example 3 except that the light diffusive sheets produced in Comparative Examples 1 to 4 were used instead of the light diffusive sheet used in Example 3, and respective area light sources were also produced.

Comparative Example 9

An area light source element was produced in the same manner as in Example 3 except that the light diffusive sheet was not used, and an area light source was also produced.

Comparative Example 10

A area light source element was produced by using a light diffusive sheet that has the same structure as that of the light diffusive sheet in Example 1 except for not having a backcoat layer instead of the light diffusive sheet used in Example 3, and an area light source was also produced.

Cold-cathode tubes of the area light sources constructed by using the area light source elements obtained in the examples and the comparative examples as described above were lighted. Luminance was measured from the front direction and at 30° and 45° right and left from the front direction in a direction horizontal with respect to the cold-cathode tube. Occurrence of a rainbow-like annular pattern was evaluated by visually observing the area light sources from the front direction. The results are shown in Table 2.

TABLE 2

| | Luminance (cd/m$^2$) | | | | | Rainbow-like annular pattern |
|---|---|---|---|---|---|---|
| | 45° left | 30° left | Front | 30° right | 45° right | |
| Example | | | | | | |
| 3 | 330 | 510 | 1880 | 510 | 330 | Absent |
| 4 | 340 | 520 | 1880 | 520 | 340 | Absent |
| Comparative Example | | | | | | |
| 5 | 330 | 510 | 1880 | 510 | 330 | Present |
| 6 | 330 | 510 | 1880 | 510 | 330 | Present |
| 7 | 320 | 530 | 1890 | 530 | 320 | Present |
| 8 | 310 | 440 | 1690 | 440 | 310 | Absent |
| 9 | 240 | 450 | 2290 | 450 | 240 | — |
| 10 | 320 | 500 | 1890 | 500 | 320 | Present |

As shown in the results in Tables 1 and 2, the light diffusive sheets obtained in Examples 1 and 2 satisfied optical characteristics as a light diffusive sheet, and occurrence of a rainbow-like annular pattern could be prevented without deteriorating the front luminance and view angle as an area light source when used for an area light source as an area light source element in Examples 3 and 4.

On the other hand, although the light diffusive sheets produced in Comparative Examples 1–3 satisfied optical characteristics as a light diffusive sheet, they had the mean spacing exceeding 80 μm, and a rainbow-like annular pattern occurred when they were used for the area light sources as area light source elements in Comparative Examples 5–7.

Further, although the light diffusive sheet obtained in Comparative Example 4 satisfied optical characteristics as a light diffusive sheet, the front luminance and view angle as an area light source were deteriorated when it was used for the area light source as an area light source element in Comparative Example 8 since the arithmetical mean deviation of the backcoat layer exceeded 0.5 μm.

Further, since the area light source element obtained in Comparative Example 9 did not have a light diffusive sheet laminated on the downward-facing prism sheet, the right luminance and the left luminance were extremely lower than the front luminance, and hence the view angle characteristic was extremely deteriorated.

The invention claimed is:

1. A light diffusive sheet comprising a transparent polymer film, a light diffusion layer formed on one surface of the transparent polymer film and a backcoat layer formed on the other surface of the transparent polymer film, wherein an uneven surface having arithmetical mean deviation of 0.5 μm or less and mean spacing of 80 μm or narrower is formed on the backcoat layer.

2. The light diffusive sheet according to claim 1, wherein the backcoat layer is formed at least with a binder resin and particles, and the particles are mixed in a proportion of 1 part by weight or more and 10 parts by weight or less based on 100 parts by weight of the binder resin.

3. The light diffusive sheet according to claim 2, wherein the particles are a mixture of particles having two different mean particle diameters.

4. A light diffusive sheet comprising a transparent polymer film, a light diffusion layer formed on one surface of the transparent polymer film and a backcoat layer formed on the other surface, wherein the backcoat layer is formed at least with a binder resin and a mixture of particles having two different mean particle diameters, and the particles are included in a proportion of 1 part by weight or more and 10 parts by weight or less based on 100 parts by weight of the binder resin.

5. The light diffusive sheet according to claim 4, wherein the mixture of particles is a mixture of particles having a mean particle diameter of 5 μm or more and particles having a mean particle diameter of less than 5 μm.

6. The light diffusive sheet according to claim 4, wherein each of the particles having two different mean particle diameters is included in a proportion of 0.5 parts by weight or more and 9.5 parts by weight or less based on 100 parts by weight of the binder resin.

7. The light diffusive sheet according to claims 4, wherein the mixing ratio of the two kinds of particles is 1:2–1:10 by weight ratio of larger particles to smaller particles.

8. The light diffusive sheet according to claim 4, wherein the difference between the mean particle diameters of particles having two different mean particle diameters is 2 μm or more.

9. An area light source element comprising a prism sheet having a prism surface laminated on the light-emitting surface of a light guide plate and an opposing surface laminated on the backcoat layer of a light dilfusive sheet according to claim 4.

* * * * *